United States Patent
Nagata et al.

(10) Patent No.: US 12,111,167 B2
(45) Date of Patent: Oct. 8, 2024

(54) SERVER DEVICE, OPERATION MANAGEMENT SYSTEM, PROGRAM, VEHICLE, AND OPERATION MANAGEMENT METHOD

(71) Applicant: TOYOTA JIDOSHA KABUSHIKI KAISHA, Aichi-ken (JP)

(72) Inventors: Yu Nagata, Chofu (JP); Kazutaka Kimura, Mishima (JP); Tomokazu Maya, Nagoya (JP); Tsuyoshi Nishioka, Toyota (JP); Takaharu Tateishi, Nagoya (JP); Yuki Yamashita, Tokyo (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 303 days.

(21) Appl. No.: 17/718,322

(22) Filed: Apr. 12, 2022

(65) Prior Publication Data

US 2022/0412760 A1    Dec. 29, 2022

(30) Foreign Application Priority Data

Jun. 23, 2021 (JP) ................ 2021-104390

(51) Int. Cl.
*G01C 21/34* (2006.01)
*G01C 21/36* (2006.01)

(52) U.S. Cl.
CPC ..... *G01C 21/3484* (2013.01); *G01C 21/3605* (2013.01); *G01C 21/3661* (2013.01)

(58) Field of Classification Search
CPC ........... G01C 21/3484; G01C 21/3605; G01C 21/3661; G01C 21/343; G01C 21/3438;
(Continued)

(56) References Cited

U.S. PATENT DOCUMENTS

| 11,663,532 B2 * | 5/2023 | Shimodaira ...... G06Q 10/06315 |
| | | 701/411 |
| 2013/0090849 A1 * | 4/2013 | Uetake ................ B61L 15/0045 |
| | | 701/400 |

(Continued)

FOREIGN PATENT DOCUMENTS

| EP | 3471051 A1 * | 4/2019 |
| JP | 2019-008769 A | 1/2019 |

(Continued)

OTHER PUBLICATIONS

JP6889320B1.translate, Guidance Device, Guidance Method, and Guidance Program (Year: 2021).*

(Continued)

*Primary Examiner* — B M M Hannan
(74) *Attorney, Agent, or Firm* — HAUPTMAN HAM, LLP (57) ABSTRACT

A server device includes a communication unit and a control unit that send and receives information to and from another device via the communication unit. The control unit receives, from a plurality of terminal devices, information indicating a boarding point at which a user of each of the terminal devices desires to board a vehicle, sends, to the vehicle, information for causing the vehicle to travel along a route via a nearby region of each of a plurality of the boarding points while satisfying a predetermined condition, and notifies the terminal devices of the route.

20 Claims, 6 Drawing Sheets

(58) Field of Classification Search
CPC .... G06Q 10/02; G06Q 30/0207; G06Q 50/40; G08G 1/202
USPC .......................................................... 701/425
See application file for complete search history.

(56) References Cited

U.S. PATENT DOCUMENTS

| | | | | |
|---|---|---|---|---|
| 2017/0061801 | A1* | 3/2017 | Huang | G01C 21/3423 |
| 2018/0374014 | A1 | 12/2018 | Matsui et al. | |
| 2019/0079519 | A1* | 3/2019 | Hwang | G05D 1/0212 |
| 2019/0086229 | A1* | 3/2019 | Chintakindi | G01C 21/3691 |
| 2019/0120640 | A1* | 4/2019 | Ho | G01C 21/3453 |
| 2019/0303806 | A1* | 10/2019 | Namba | G06Q 50/40 |
| 2019/0383622 | A1* | 12/2019 | Aich | G06Q 10/02 |
| 2020/0018610 | A1* | 1/2020 | Kaneko | G01C 21/3415 |
| 2020/0065842 | A1* | 2/2020 | Viswanathan | G06Q 50/40 |
| 2020/0209011 | A1* | 7/2020 | Iwasaki | G01C 21/3438 |
| 2020/0272955 | A1* | 8/2020 | Shimodaira | G06Q 10/047 |
| 2020/0273335 | A1* | 8/2020 | Murakami | G08G 1/205 |
| 2020/0285245 | A1* | 9/2020 | Noguchi | G08G 1/149 |
| 2020/0327460 | A1* | 10/2020 | Suzuki | H04W 4/024 |
| 2021/0174680 | A1 | 6/2021 | Yabushita et al. | |
| 2022/0119020 | A1* | 4/2022 | Thiyagarajan | B61L 3/02 |
| 2022/0307848 | A1* | 9/2022 | Gerrese | G08G 1/096838 |

FOREIGN PATENT DOCUMENTS

| | | | | |
|---|---|---|---|---|
| JP | 2019016290 | A * | 1/2019 | G06Q 10/02 |
| JP | 2019135616 | A * | 8/2019 | G06Q 10/02 |
| JP | 6595673 | B2 * | 10/2019 | G01C 21/3605 |
| JP | 6889320 | B1 * | 6/2021 | |
| JP | 2021092932 | A * | 6/2021 | G06Q 10/04 |
| JP | 2022006488 | A * | 1/2022 | |
| JP | 7399077 | B2 * | 12/2023 | |
| WO | WO-2018230691 | A1 * | 12/2018 | G01C 21/3407 |
| WO | WO-2018230692 | A1 * | 12/2018 | B60W 60/00253 |
| WO | 2019159605 | A1 | 8/2019 | |
| WO | WO-2021033602 | A1 * | 2/2021 | |
| WO | WO-2023228687 | A1 * | 11/2023 | |

OTHER PUBLICATIONS

KR20200114825A translate, Method and Server for Logistics Transportation With Carryingpassengers (Year: 2020).*

* cited by examiner

SERVER DEVICE, OPERATION MANAGEMENT SYSTEM, PROGRAM, VEHICLE, AND OPERATION MANAGEMENT METHOD

CROSS-REFERENCE TO RELATED APPLICATION

This application claims priority to Japanese Patent Application No. 2021-104390 filed on Jun. 23, 2021, incorporated herein by reference in its entirety.

BACKGROUND

1. Technical Field

The present disclosure relates to a server device, an operation management system, a program, a vehicle, and an operation management method.

2. Description of Related Art

In an on-demand bus that operates according to a request from a user, various means for improving convenience for the user have been proposed. For example, WO 2019/159605 discloses a system for determining a boarding and alighting point according to a position of the user on a bus operation route.

SUMMARY

There is room for improving efficiency of on-demand bus operation.

The present disclosure provides a server device and the like capable of improving operational efficiency of the on-demand bus.

A server device according to the present disclosure includes a communication unit, and a control unit that sends and receives information to and from another device via the communication unit. The control unit receives, from a plurality of terminal devices, information indicating a boarding point at which a user of each of the terminal devices desires to board a vehicle, sends, to the vehicle, information for causing the vehicle to travel along a route via a nearby region of each of a plurality of the boarding points while satisfying a predetermined condition, and notifies the terminal devices of the route.

A vehicle according to the present disclosure is a vehicle that includes a communication unit and a control unit that sends and receives information to and from another device via the communication unit, and travels in accordance with an instruction from the control unit. The control unit receives, from a server device that receives from a plurality of terminal devices information indicating a boarding point at which a user of each of the terminal devices desires to board the vehicle, information on a route via a nearby region of each of a plurality of the boarding points while satisfying a predetermined condition, and outputs an instruction for causing the vehicle to travel along the route.

A vehicle management method according to the present disclosure is an operation management method of a vehicle by a system including a server device and the vehicle communicating with the server device. The server device receives, from a plurality of terminal devices, information indicating a boarding point at which a user of each of the terminal devices desires to board the vehicle, sends, to the vehicle, information for causing the vehicle to travel along a route via a nearby region of each of a plurality of the boarding points while satisfying a predetermined condition, and notifies the terminal devices of the route, and the vehicle moves along the route based on the information sent from the server device.

With the server device and the like according to the present disclosure, it is possible to improve the operational efficiency of the on-demand bus.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment will be described.

Figure 1:
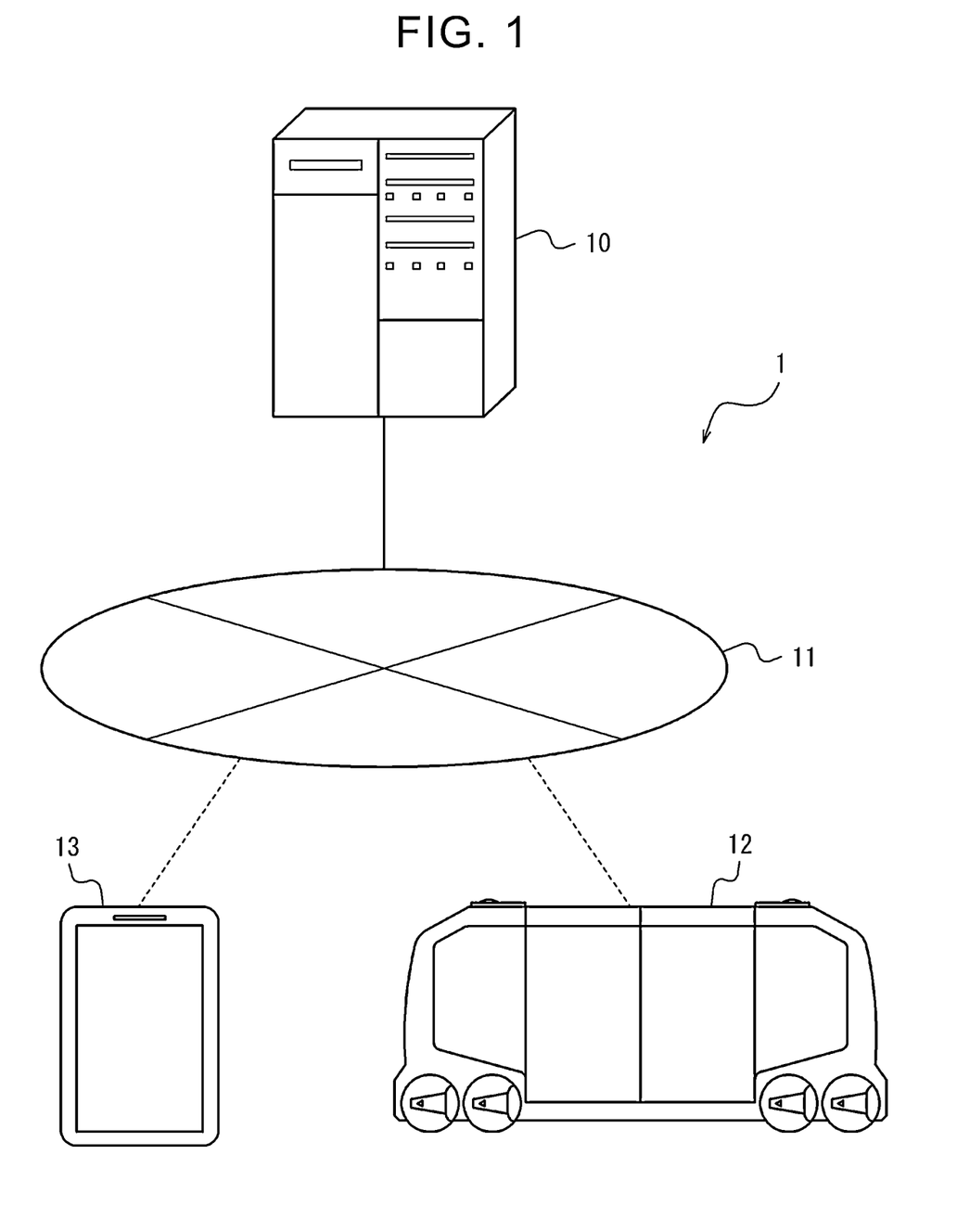
FIG. 1 is a diagram showing a configuration example of an operation management system.

FIG. 1 is a diagram showing a configuration example of an operation management system according to one embodiment. An operation management system 1 is a system that supports operation management of an on-demand bus. The operation management system 1 includes one or more server devices 10, one or more vehicles 12, and one or more terminal devices 13 that are connected to each other via a network 11 such that the server devices 10, the vehicles 12, and the terminal devices 13 communicate with each other. The server device 10 is, for example, a server computer belonging to a cloud computing system or other computing systems and functioning as a server implemented with various functions. The server device 10 is used by a business operator that provides an on-demand bus operation service. The vehicle 12 includes a communication function and an information processing function, and is connected to the network 11 via a mobile communication network. The vehicle 12 is, for example, a bus vehicle that passengers can board, which is provided for a service as an on-demand bus that goes around a specific area. The vehicle 12 may be driven by a driver, or may be automated at any level (for example, any level from level 1 to level 5 defined by the Society of Automotive Engineers (SAE)). Further, the vehicle 12 may be a battery electric vehicle or a hybrid electric vehicle that uses battery power for at least part of the energy for traveling. The terminal device 13 is, for example, an information terminal device including a communication function such as a smartphone or a tablet terminal device, and is used by a user who boards the vehicle 12. The network 11 is the Internet, for example, but includes an ad hoc network, a local area network (LAN), a metropolitan area network (MAN), another network, or a combination thereof.

In the present embodiment, when the user of the terminal device 13 desires to board the vehicle 12, the operation management system 1 manages the operation of the vehicle 12 by optimizing an operation route of the vehicle 12 in the server device 10 according to a boarding point at which the user desires to board the vehicle 12 (hereinafter referred to as a desired boarding point). The server device 10 includes a communication unit and a control unit that sends and receives information to and from another device via the communication unit. The control unit receives, from a plurality of terminal devices 13, information indicating a desired boarding point at which the user of each terminal device 13 desires to board the vehicle 12. The control unit sends to the vehicle 12 an instruction for causing the vehicle 12 to travel along a route via a nearby region of a plurality of the desired boarding points while satisfying predetermined conditions such as the shortest time and the shortest distance, and notifies the terminal devices 13 of the route. According to the operation management system 1, the vehicle 12 passes through the nearby region of each desired boarding point instead of each desired boarding point, and the user can board the vehicle 12 from a boarding point in the nearby region thereof (an actual boarding point in the nearby region is called an boarding execution point). As described above, the operation management system 1 contributes to convenience for the user to a certain extent or more, and makes it possible to save fuel or electric power by shortening a moving distance of the vehicle 12. That is, by optimizing a movement route of the vehicle 12, it is possible to improve operational efficiency of the vehicle 12.

Figure 2:
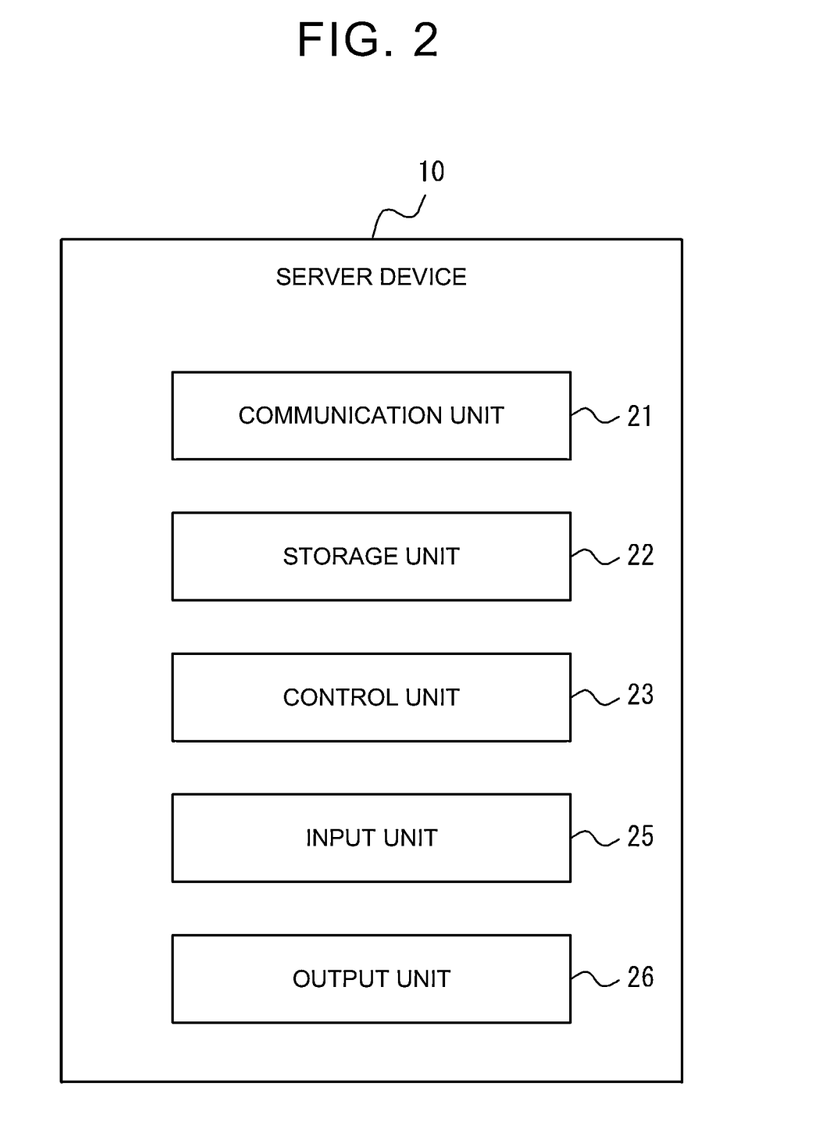
FIG. 2 is a diagram showing a configuration example of a server device.

FIG. 2 is a diagram for illustrating a configuration example of the server device 10. The server device 10 includes a communication unit 21, a storage unit 22, a control unit 23, an input unit 25, and an output unit 26. The server device 10 is, for example, one computer. Alternatively, the server device 10 may be composed of two or more computers that are connected such that information communication can be performed and operate in cooperation with each other. In that case, the configuration shown in FIG. 2 is appropriately arranged in the two or more computers.

The communication unit 21 includes one or more communication interfaces. The communication interface is, for example, a LAN interface. The communication unit 21 receives information used for the operation of the server device 10, and sends information obtained through the operation of the server device 10. The server device 10 is connected to the network 11 via the communication unit 21, and performs information communication with the vehicle 12 via the network 11.

The storage unit 22 includes, for example, one or more semiconductor memories, one or more magnetic memories, one or more optical memories, or a combination of at least two of them functioning as a main storage device, an auxiliary storage device, or a cache memory. The semiconductor memory is, for example, a random access memory (RAM) or a read-only memory (ROM). The RAM is, for example, a static RAM (SRAM) or a dynamic RAM (DRAM). The ROM is, for example, an electrically erasable programmable read-only memory (EEPROM). The storage unit 22 stores the information used for the operation of the server device 10 and the information obtained through the operation of the server device 10.

The control unit 23 includes one or more processors, one or more dedicated circuits, or a combination thereof. The processor is a general-purpose processor such as a central processing unit (CPU) or a dedicated processor specialized for a specific process such as a graphics processing unit (GPU). The dedicated circuit is, for example, a field-programmable gate array (FPGA) or an application-specific integrated circuit (ASIC). The control unit 23 executes information processing related to the operation of the server device 10 while controlling various units of the server device 10.

The input unit 25 includes one or more input interfaces. The input interface is, for example, a physical key, a capacitive key, a pointing device, a touch screen integrated with a display, or a microphone that receives voice input. The input unit 25 receives operation for inputting the information used for the operation of the server device 10, and sends the input information to the control unit 23.

The output unit 26 includes one or more output interfaces. The output interface is, for example, a display or a speaker. The display may be, for example, a liquid crystal display (LCD), an organic electroluminescence (EL) display, or the like. The output unit 26 outputs the information obtained through the operation of the server device 10.

The function of the server device 10 is realized when a control program is executed by the processor included in the control unit 23. That is, the control program is a program for causing the computer to function as the server device 10. Part or all of the functions of the server device 10 may be realized by a dedicated circuit included in the control unit 23. Further, the control program may be stored in a non-transitory recording/storage medium that can be read by the server device 10, and the server device 10 may read the control program from the medium.

Figure 3:
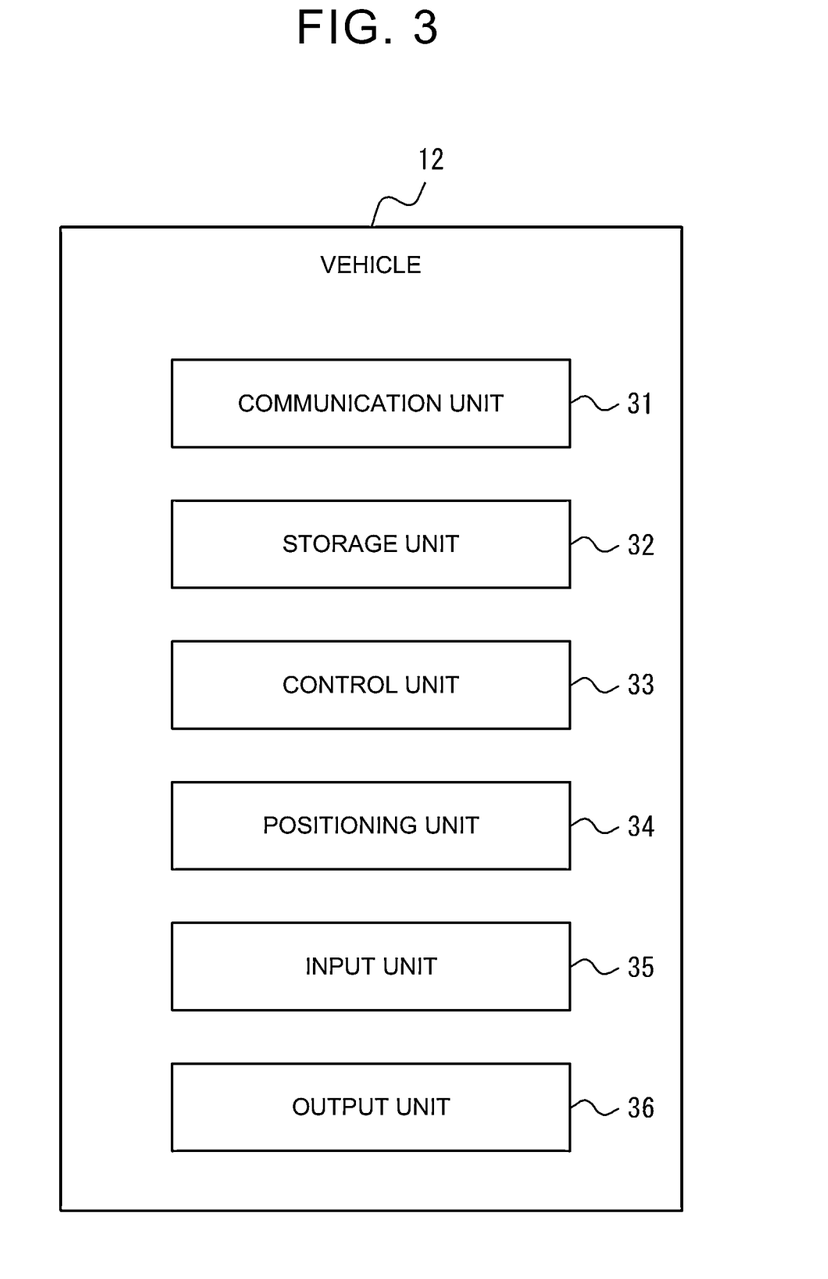
FIG. 3 is a diagram showing a configuration example of a vehicle.

FIG. 3 shows a configuration example of the vehicle 12 according to the present embodiment. The vehicle 12 includes a communication unit 31, a storage unit 32, a control unit 33, a positioning unit 34, an input unit 35, and an output unit 36. One or more of these may be configured as one control device, or may be composed of a personal computer including a tablet terminal, a smartphone terminal, and a navigation device. Alternatively, each unit may be connected so as to be able to perform information communication via an in-vehicle network conforming to a standard such as a controller area network (CAN).

The communication unit 31 includes one or more communication interfaces. The communication interface is, for example, an interface conforming to mobile communication standards such as the long term evolution (LTE), the fourth generation (4G), or the fifth generation (5G). The communication unit 31 receives information used for the operation of the control unit 33, and sends information obtained through the operation of the control unit 33. The control unit 33 is connected to the network 11 through the communication unit 31 via a mobile communication base station, and performs information communication with other devices via the network 11.

The storage unit 32 includes one or more semiconductor memories, one or more magnetic memories, one or more optical memories, or a combination of at least two of them. The semiconductor memory is, for example, a RAM or a ROM. The RAM is, for example, a SRAM or a DRAM. The ROM is, for example, an EEPROM. The storage unit 32 functions as, for example, a main storage device, an auxiliary storage device, or a cache memory. The storage unit 32 stores the information used for the operation of the control unit 33 and the information obtained through the operation of the control unit 33.

The control unit 33 includes one or more processors, one or more dedicated circuits, or a combination thereof. The processor is a general-purpose processor such as a CPU, or a dedicated processor specialized for a specific process. The dedicated circuit is, for example, an FPGA or an ASIC. The control unit 33 executes information processing related to the operation of the vehicle 12 while controlling various units of the control unit 33.

The positioning unit 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioning unit 34 acquires position information of the vehicle 12.

The input unit 35 includes one or more input interfaces. The input interface is, for example, a physical key, a capacitive key, a pointing device, a touch screen integrated with a display, or a microphone that receives voice input. The input interface may further include a camera that captures an image or an image code, or an integrated circuit (IC) card reader. The input unit 35 receives operation for inputting the information used for the operation of the control unit 33, and sends the input information to the control unit 33.

The output unit 36 includes one or more output interfaces. The output interface is, for example, a display or a speaker. The display is, for example, an LCD or an organic EL display. The output unit 36 outputs the information obtained through the operation of the control unit 33.

The function of the control unit 33 is realized by executing a control program using the processor included in the control unit 33. The control program is a program for causing the processor to function as the control unit 33. Part or all of the functions of the control unit 33 may be realized by a dedicated circuit included in the control unit 33.

The control unit 33 controls the communication unit 31, the storage unit 32, the positioning unit 34, the input unit 35, the output unit 36, and a power supply unit 37 while exchanging various kinds of information with each of the units, and controls the operation of the vehicle 12. When the vehicle 12 is operated, the control unit 33 controls the operation of the vehicle 12 by presenting various kinds of information necessary for driving to a driver via the output unit 36 and controlling automatic driving of the vehicle 12.

Figure 4:
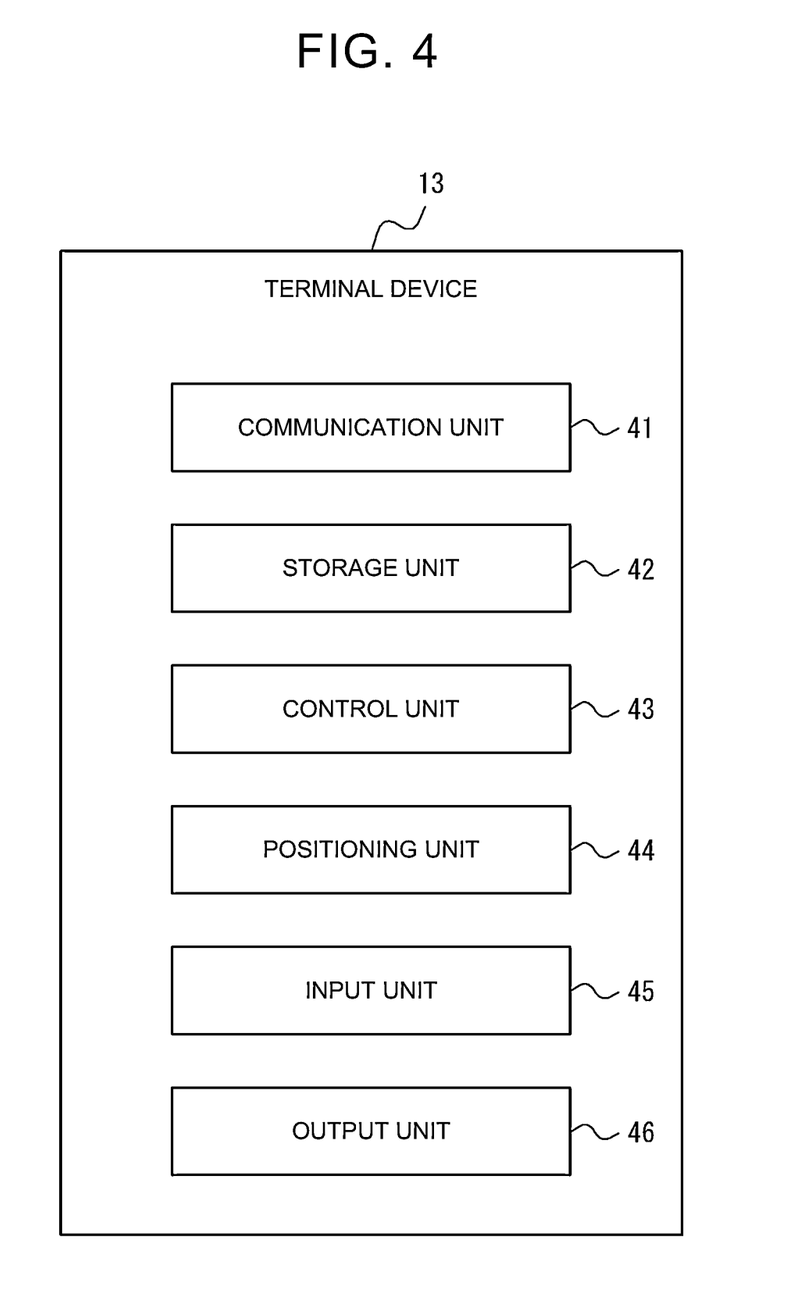
FIG. 4 is a diagram showing a configuration example of a terminal device.

FIG. 4 is a diagram for illustrating a configuration of the terminal device 13. The terminal device 13 is an information terminal device such as a smartphone, a tablet terminal device, or a personal computer. The terminal device 13 includes a communication unit 41, a storage unit 42, a control unit 43, a positioning unit 44, an input unit 45, and an output unit 46.

The communication unit 41 has a communication module corresponding to a wired or wireless LAN standard, a module corresponding to a mobile communication standard such as LTE, 4G, and 5G, and the like. The terminal device 13 is connected to the network 11 through the communication unit 41 via a nearby router device or a mobile communication base station, and performs information communication with other devices via the network 11.

The storage unit 42 includes one or more semiconductor memories, one or more magnetic memories, one or more optical memories, or a combination of at least two of them. The semiconductor memory is, for example, a RAM or a ROM. The RAM is, for example, a SRAM or a DRAM. The ROM is, for example, an EEPROM. The storage unit 42 functions as, for example, a main storage device, an auxiliary storage device, or a cache memory. The storage unit 42 stores the information used for the operation of the control unit 43 and the information obtained through the operation of the control unit 43.

The control unit 43 has, for example, one or more general-purpose processors such as a CPU, a micro processing unit (MPU), or one or more dedicated processors specialized for a specific process. Alternatively, the control unit 43 may have one or more dedicated circuits such as an FPGA and an ASIC. The control unit 43 comprehensively controls the operation of the terminal device 13 by operating according to the control/processing program or operating according to an operation procedure implemented as a circuit. Then, the control unit 43 sends and receives various kinds of information to and from the server device 10 and the like via the communication unit 41, and performs the operation according to the present embodiment.

The positioning unit 44 includes one or more GNSS receivers. The GNSS includes, for example, at least one of GPS, QZSS, BeiDou, GLONASS, and Galileo. The positioning unit 44 acquires the position information of the terminal device 13.

The input unit 45 includes one or more input interfaces. The input interface is, for example, a physical key, a capacitive key, a pointing device, a touch screen integrated with a display, or a microphone that receives voice input. The input interface may further include a camera that captures images or image codes, or an IC card reader. The input unit 45 receives operation for inputting the information used for the operation of the control unit 43, and sends the input information to the control unit 43.

The output unit 46 includes one or more output interfaces. The output interface is, for example, a display or a speaker. The display is, for example, an LCD or an organic EL display. The output unit 46 outputs the information obtained through the operation of the control unit 43.

The function of the control unit 43 is realized by executing a control program using the processor included in the control unit 43. The control program is a program for causing the processor to function as the control unit 43. Part or all of the functions of the control unit 43 may be realized by a dedicated circuit included in the control unit 43.

Figure 5:
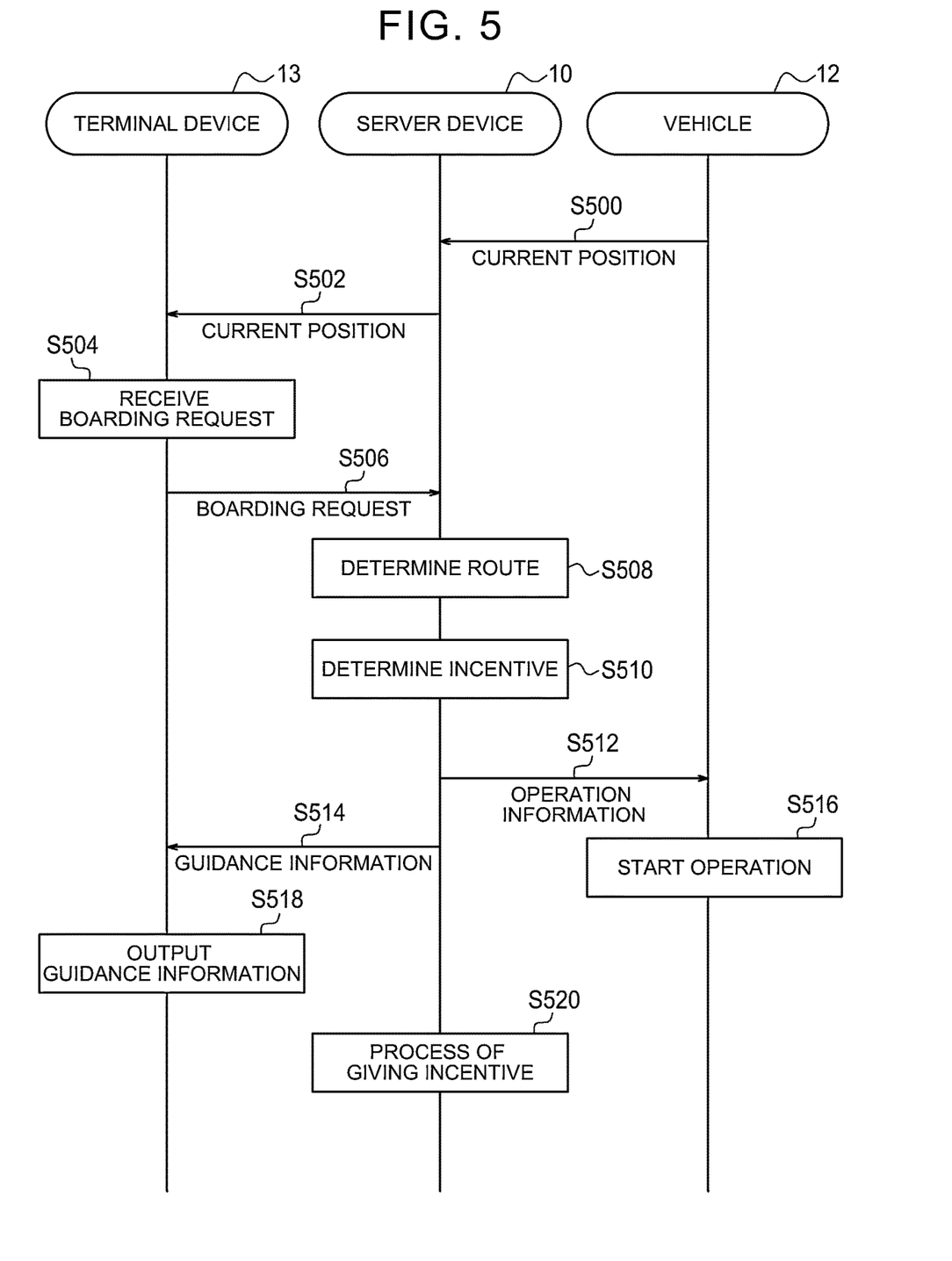
FIG. 5 is a sequence diagram showing an operation example of the operation management system.

FIG. 5 is a sequence diagram showing an operation procedure of the operation management system 1. FIG. 5 shows a procedure related to a linkage operation of the server device 10, the vehicle 12, and the terminal device 13.

In step S500, information on the current position of the vehicle 12 is sent from the vehicle 12 to the server device 10. The control unit 33 of the vehicle 12 sends, for example, the information on the current position acquired by the positioning unit 34 to the server device 10 via the communication unit 31 at a cycle of several seconds to several minutes. The control unit 23 of the server device 10 receives the information sent from the vehicle 12 via the communication unit 21 and stores it in the storage unit 22.

In step S502, the information on the current position of the vehicle 12 scheduled to be operated is sent from the server device 10 to the terminal device 13. The control unit 23 of the server device 10 specifies the vehicle 12 scheduled to be operated based on an operation schedule for each vehicle 12 stored in advance in the storage unit 22. The operation schedule includes identification information of the vehicle 12, position information of a departure point, departure time, position information of an end point, arrival time, and the like. The control unit 23 sends the information on the current position of the specified vehicle 12 to the terminal device 13 via the communication unit 21. The control unit 43 of the terminal device 13 receives the information sent from the server device 10 via the communication unit 41 and stores it in the storage unit 42.

In step S504, the control unit 43 of the terminal device 13 receives a boarding request from a user. The boarding request includes identification information of the user and information on a desired boarding point where the user desires to board the vehicle. The information on the desired boarding point is, for example, information indicating a position on a map. The boarding request may include desired boarding time at which the user desires to board the vehicle. The control unit 43 presents the user with a map on which the current position of the vehicle 12 is superimposed on a display of the output unit 46, and prompts the user to input a desired boarding point or the like. Then, the control unit 43 receives the desired boarding point selected by the user on the map, the desired boarding time input by the user, the user information, and the like by the touch panel of the input unit 45. The user information may be stored in advance in the storage unit 42 as user registration information.

Further, the control unit 43 of the terminal device 13 may accept input of information on an allowable range of a nearby region of the desired boarding points. The allowable range of the nearby region where the boarding execution point is set is a range of a distance in which movement of the user for boarding the vehicle 12 is allowed. When the user performs operations such as tapping a point on the map to specify the allowable range of the nearby region of the desired boarding point, and inputting a numerical value indicating the allowable range (for example, a numerical value in the range of 1 km to 3 km) for example, the control unit 43 receives the input corresponding to the operations by the input unit 45.

In step S506, the boarding request is sent from the terminal device 13 to the server device 10. The boarding request includes the current position of the terminal device 13. The control unit 43 of the terminal device 13 sends the boarding request including the information on the current position acquired by the positioning unit 44 to the server device 10 via the communication unit 41. In addition, the boarding request may include the information on the allowable range of the nearby region. The server device 10 receives the information sent from the terminal device 13 via the communication unit 21 and stores it in the storage unit 22.

In step S508, the control unit 23 of the server device 10 determines a route of the vehicle 12 based on the boarding request sent from the terminal devices 13. The control unit 23 uses the map information stored in advance in the storage unit 22 to determine a route via the nearby region of the desired boarding points according to any algorithm.

Figure 6:
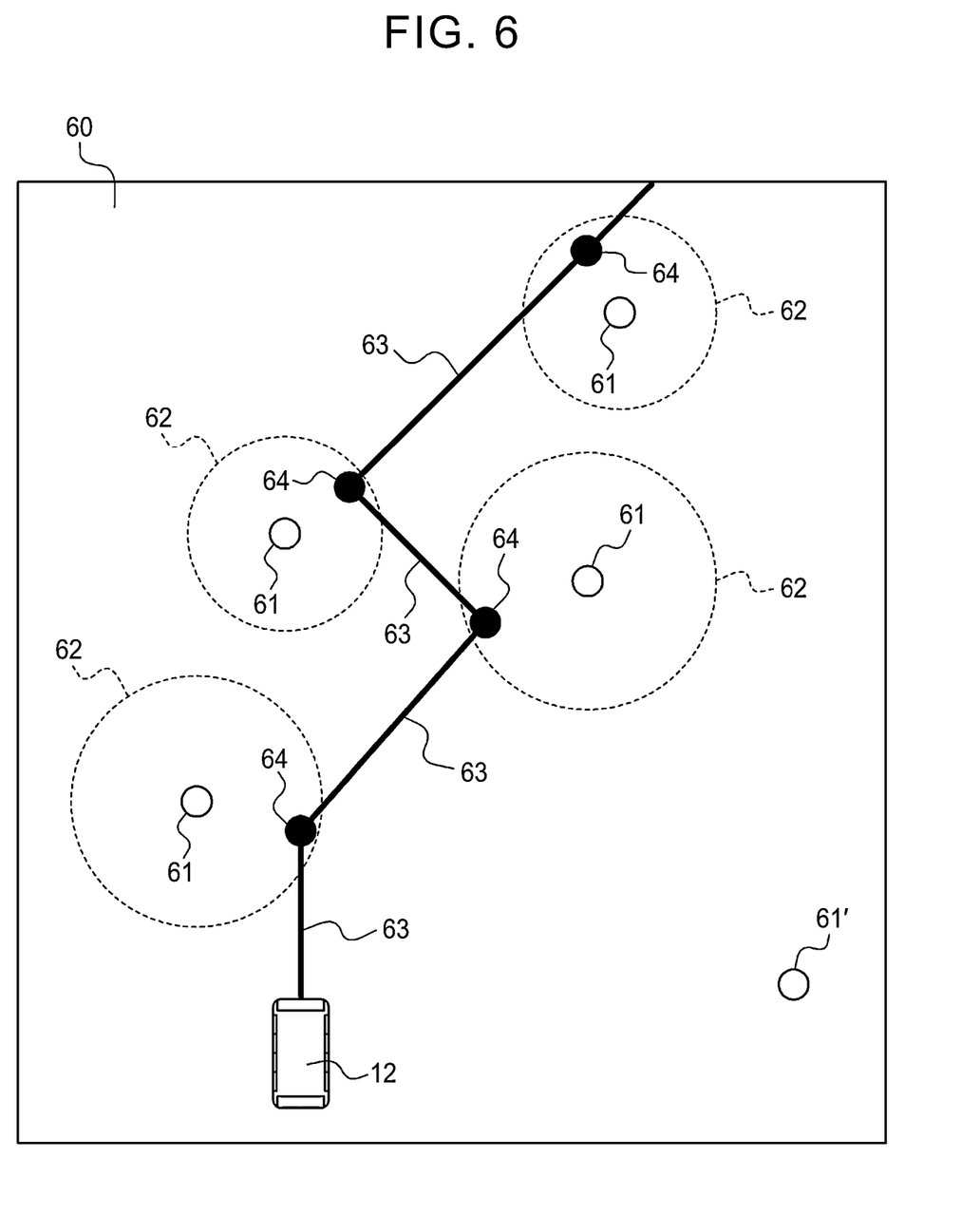
FIG. 6 is a diagram showing an example of a route of the vehicle.

FIG. 6 shows an example of the route of the vehicle 12. On the map 60, desired boarding points 61 corresponding to boarding requests from the terminal devices 13 and nearby regions 62 thereof are shown. Each of the nearby regions 62 is set to an appropriate size in advance and is stored in the storage unit 22. The nearby region 62 is, for example, a range of approximately several hundred meters to 1 km in radius from the desired boarding point 61. When the information on the allowable range of the nearby region is sent from the terminal device 13, the control unit 23 may set the nearby region 62 to a size corresponding to the allowable range. The nearby region 62 is, for example, set to a range of approximately 1 km to 3 km in radius. Then, the control unit 23 determines a route 63 via the nearby regions 62 while satisfying a predetermined condition.

The predetermined condition is a condition that when the vehicle 12 moves at a legal speed, the vehicle 12 passes through the nearby regions 62 in the shortest time. The control unit 23 calculates required time when the vehicle 12 moves at the legal speed corresponding to each road for combinations of roads along which the vehicle 12 passes through the nearby region 62. Then, the control unit 23 determines the route 63 composed of a combination of roads such that the total required time is minimized. When calculating the required time, the control unit 23 can calculate the required time more accurately by taking into account the acceleration/deceleration of the vehicle 12 at a signal, an intersection, a corner, and the like. The route 63 is a route in which, for example, a rate of a main road on which a legal speed is high and deceleration due to the intersection and the like is not frequently required is larger than a rate of a road on which the legal speed is low, the vehicle passes through a residential area, a commercial area, and the like in which deceleration due to the signal, the intersection, and the like is frequently required.

Further, the predetermined condition is a condition that the vehicle 12 passes through the nearby regions 62 in the shortest distance. The control unit 23 determines the route 63 composed of a combination of roads such that a moving distance of the vehicle 12 is minimized from among combinations of roads along which the vehicle 12 passes through the nearby regions 62, Alternatively, the predetermined condition may be to form an approximate curve for the desired boarding points 61.

When determining the route 63, the control unit 23 may exclude a desired boarding point 61' that is separated from the other desired boarding points 61 by a reference distance or more, and determine the route 63 via the nearby region 62 of each desired boarding point 61. For example, the control unit 23 calculates distances from each of the desired boarding points 61 and 61' to other individual desired boarding points, and calculates a total value or an average value of the distances. Then, the control unit 23 excludes a desired boarding point in which the total value or the average value of the distances is equal to or more than a reference distance (for example, 1 km to several km on average) or more. Thereby, it is possible to suppress the vehicle 12 from moving along a roundabout route.

Further, the control unit 23 sets a boarding execution point 64 corresponding to each desired boarding point 61 on the route 63 by any algorithm. That is, the boarding execution point 64 is set in the nearby region 62 of the corresponding desired boarding point 61. For example, the boarding execution point 64 is set to a point where the vehicle 12 can be easily parked without obstructing traffic by taking into account the road width, the presence or absence of sidewalks, and the like. A candidate point of such a boarding execution point 64 is included in the map information in advance. The control unit 23 reads out a candidate for a boarding execution point from the storage unit 22, selects a point located on the route 63, and determines as the boarding execution point 64.

The procedure for determining the route 63 and the boarding execution point 64 above is one example, and the control unit 23 can determine the route 63, the boarding execution point 64, and the like by any algorithm.

In step S510, the control unit 23 of the server device 10 determines an incentive given to the user of the terminal device 13. The control unit 23 calculates a distance from the desired boarding point 61 to the boarding execution point 64 for each user using the identification information of the user associated with the boarding request, and reads out an incentive corresponding to the distance from the storage unit 22 to determine the incentive. In the storage unit 22, the distance from the desired boarding point 61 to the boarding execution point 64 and the incentive are stored in association with each other in advance. Here, the larger the distance, the larger the incentive to be associated. Further, the control unit 23 also gives an incentive to a user who has requested the desired boarding point 61' excluded from the route 63. In that case, such an incentive is weighted more than other incentives. The determined incentive is stored in the storage unit 22 in association with the identification information for each user.

In step S512, operation information is sent from the server device 10 to the vehicle 12. The operation information is information for causing the vehicle 12 to travel along the determined route 63, and includes information on the route 63, the position of the boarding execution point 64, and the like. The control unit 23 of the server device 10 sends the operation information to the vehicle 12 via the communication unit 21. The control unit 33 of the vehicle 12 receives the information sent from the server device 10 via the communication unit 31 and stores it in the storage unit 32.

In step S514, guidance information for guiding the user is sent from the server device 10 to the terminal device 13. The guidance information includes the route 63, the position of the boarding execution point 64, and the like, and includes information on a route from the current position of the terminal device 13 or the desired boarding point 61 to the boarding execution point 64. Further, the guidance information may include a game program for guiding the user to the boarding execution point 64. Such a game is, for example, a game in which a point is given as the user approaches the boarding execution point 64, a game in which an object or the like is discovered on the way to the boarding execution point 64 to acquire a point, and the like. The control unit 23 of the server device 10 sends the guidance information to the terminal device 13 via the communication unit 21. The control unit 43 of the terminal device 13 receives the information sent from the server device 10 via the communication unit 41 and stores it in the storage unit 42. The control unit 23 may send information for guiding a route of another vehicle 12 to the terminal device 13 of the user who has requested the desired boarding point 61' excluded from the route 63, instead of the guidance information.

In step S516, the vehicle 12 starts operation. The control unit 33 of the vehicle 12 causes the vehicle 12 to start to travel along the route 63 based on the operation information. For example, the control unit 33 outputs information on the route 63 by the output unit 36 to prompt the driver to drive along the route 63, or sends an instruction for causing an automatic driving system of the vehicle 12 to travel along the route 63.

In step S518, the terminal device 13 outputs the guidance information. The control unit 43 guides the user to the boarding execution point 64 by displaying the route to the boarding execution point 64, which is included in the guidance information, by the output unit 46 or outputting the voice. Alternatively, the control unit 43 executes the game program, and guides the user by displaying information on the point given according to the movement of the user by the output unit 46 or outputting the voice. By outputting the guidance information and presenting it to the user, it is possible to support the movement of the user from the desired boarding point 61 to the boarding execution point 64, and improve convenience and interest for the user.

In step S520, the server device 10 performs a process of giving an incentive. The control unit 23 executes a process of giving an incentive determined for each user by using the identification information of the user. The incentive is, for example, an economic value such as a point or a coupon, and is stored in the storage unit 22 in association with account information of each user. By giving such an incentive to the user, the user can obtain the consideration for the movement from the desired boarding point 61 to the boarding execution point 64. Therefore, it is possible to efficiently operate the vehicle 12 while satisfaction and convenience for the user are ensured. In addition, it is also possible to compensate the user who has requested the desired boarding point 61' excluded from the route 63.

According to the above procedure, while it is possible to contribute to the convenience for the user to a certain extent or more, it is possible to save fuel or electric power by shortening the moving distance of the vehicle 12. That is, by optimizing the movement route of the vehicle 12, it is possible to improve operational efficiency of the vehicle 12.

In the above description, a case where the vehicle 12 is an on-demand bus is taken as an example. However, the present embodiment is applied even when the vehicle 12 is one of various vehicles such as a passenger car and the like provided for a car sharing service. Further, even after the vehicle 12 starts moving, the server device 10 may receive a boarding request from the terminal device 13 as necessary, and a route may be sequentially added and updated.

Although the embodiment has been described above based on the drawings and examples, it should be noted that those skilled in the art can easily make various modifications and alterations thereto based on the present disclosure. It should be noted, therefore, that these modifications and alterations are within the scope of the present disclosure. For example, the functions included in each means, each step, etc. can be rearranged so as not to be logically inconsistent, and a plurality of means, steps, etc. can be combined into one or divided.

What is claimed is:

1. A server device, comprising:
   a communication unit configured to communicate with a plurality of terminal devices and a vehicle; and
   a control unit configured to
   receive, through the communication unit from the plurality of terminal devices, information indicating a plurality of boarding points at which a user of each of the plurality of terminal devices requested to board the vehicle,
   determine a route via a nearby region of each of the plurality of boarding points, wherein
   the route satisfies a predetermined condition, and
   among the plurality of boarding points, a boarding point that is separated by at least a predetermined distance from other boarding points is excluded from the route,
   send, through the communication unit, to the vehicle, operation information for causing the vehicle to travel along the route,
   notify the plurality of terminal devices of the route, and
   execute a process of giving an incentive to the user who moved from the excluded boarding point to, among the plurality of boarding points, one of boarding points other than the excluded boarding point to board the vehicle.

2. The server device according to claim 1, wherein the control unit is configured to execute the process of giving the incentive corresponding to a distance from the excluded boarding point to the route.

3. The server device according to claim 1, wherein the predetermined condition is a condition that when the vehicle moves at a predetermined speed, the vehicle passes through the nearby region of each of the plurality of boarding points other than the excluded boarding point in the shortest time.

4. The server device according to claim 1, wherein the predetermined condition is a condition that the vehicle passes through the nearby region of each of the plurality of boarding points other than the excluded boarding point in the shortest distance.

5. The server device according to claim 1, wherein the control unit is configured to send guidance information for guiding the user from each of the plurality of boarding points to the route to each of the plurality of terminal devices corresponding to the plurality of boarding points.

6. The server device according to claim 1, wherein the control unit is configured to
receive further information on an allowable range of the nearby region of each of the plurality of boarding points from the plurality of terminal devices, and
determine the route in consideration of the allowable range.

7. The server device according to claim 1, wherein the route is not via the plurality of boarding points.

8. An operation management system, comprising:
a vehicle, and
the server device according to claim 1.

9. A non-transitory computer readable medium storing a program that is executed by a computer to cause the computer to operate as the server device according to claim 1.

10. The server device according to claim 1, wherein the control unit is further configured to, for the user at each of the plurality of boarding points other than the excluded boarding point,
set, on the route, a corresponding boarding execution point for the user to board the vehicle,
calculate a first distance from the boarding point the user is at to the corresponding boarding execution point, and
determine the incentive to the user based on the first distance.

11. The server device according to claim 10, wherein the control unit is further configured to, for the user at the excluded boarding point,
set, on the route, a boarding execution point for the user to board the vehicle,
calculate a second distance from the excluded boarding point to the boarding execution point, and
determine the incentive to the user at the excluded boarding point based on the second distance, wherein the incentive to the user at the excluded boarding point is weighted more than the incentive to the user at each of the boarding points other than the excluded boarding point.

12. A vehicle, comprising:
a communication unit configured to communicate with a server device, wherein the server device is configured to receive, from a plurality of terminal devices, information indicating a plurality of boarding points at which a user of each of the plurality of terminal devices requested to board the vehicle; and
a control unit configured to
receive, through the communication unit, from the server device, operation information on a route via a nearby region of each of a plurality of boarding points, wherein the route satisfies a predetermined condition, and
output an instruction for causing the vehicle to travel along the route, wherein
the server device is configured to
determine the route, wherein among the plurality of boarding points, a boarding point that is separated by at least a predetermined distance from other boarding points is excluded from the route, and
execute a process of giving an incentive to the user who moved from the excluded boarding point to, among the plurality of boarding points, one of boarding points other than the excluded boarding point to board the vehicle.

13. The vehicle according to claim 12, wherein the route is not via the plurality of boarding points.

14. An operation management method of a vehicle by a system including a server device and the vehicle communicating with the server device, the method comprising:
receiving, by the server device from a plurality of terminal devices, information indicating a plurality of boarding points at which a user of each of the plurality of terminal devices requested to board the vehicle;
determining, by the server device, a route via a nearby region of each of the plurality of boarding points, wherein
the route satisfies a predetermined condition, and
among the plurality of boarding points, a boarding point that is separated by at least a predetermined distance from other boarding points is excluded from the route,
sending, by the server device to the vehicle, operation information for causing the vehicle to travel along the route;
notifying, by the server device, the plurality of terminal devices of the route;
causing the vehicle to move along the route based on the information sent from the server device; and
executing, by the server device, a process of giving an incentive to the user who moved from the excluded boarding point to, among the plurality of boarding points, one of boarding points other than the excluded boarding point to board the vehicle.

15. The operation management method according to claim 14, wherein
the server device executes the process of giving the incentive corresponding to a distance from the excluded boarding point to the route.

16. The operation management method according to claim 14, wherein
the predetermined condition is a condition that when the vehicle moves at a predetermined speed, the vehicle passes through the nearby regions of each of the plurality of boarding points other than the excluded boarding point in the shortest time.

17. The operation management method according to claim 14, wherein
the predetermined condition is a condition that the vehicle passes through the nearby region of each of the plurality of boarding points other than the excluded boarding point in the shortest distance.

18. The operation management method according to claim 14, further comprising:
sending, by the server device, guidance information for guiding the user from each of the plurality of boarding points to the route to each of the plurality of terminal devices corresponding to the plurality of boarding points.

19. The operation management method according to claim 14, further comprising:

receiving, by the server device, further information on an allowable range of the nearby region of each of the plurality of boarding points from the plurality of terminal devices, and determining, by the server device, the route in consideration of the allowable range.

20. The operation management method according to claim 14, wherein the route is not via the plurality of boarding points.

* * * * *